(12) United States Patent
Sharma et al.

(10) Patent No.: US 12,353,992 B2
(45) Date of Patent: Jul. 8, 2025

(54) SYSTEMS AND METHODS FOR PROVIDING A MACHINE-LEARNED MODEL WITH ADJUSTABLE COMPUTATIONAL DEMAND

(71) Applicant: Google LLC, Mountain View, CA (US)

(72) Inventors: Abhanshu Sharma, Zurich (CH); Alexander Mordvintsev, Langnau am Albis (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 1103 days.

(21) Appl. No.: 16/972,429

(22) PCT Filed: Sep. 19, 2019

(86) PCT No.: PCT/US2019/051870
§ 371 (c)(1),
(2) Date: Dec. 4, 2020

(87) PCT Pub. No.: WO2020/072205
PCT Pub. Date: Apr. 9, 2020

(65) Prior Publication Data
US 2021/0232912 A1    Jul. 29, 2021

Related U.S. Application Data

(60) Provisional application No. 62/739,584, filed on Oct. 1, 2018.

(51) Int. Cl.
*G06N 3/08*    (2023.01)
*G06N 3/04*    (2023.01)

(52) U.S. Cl.
CPC ............. *G06N 3/08* (2013.01); *G06N 3/04* (2013.01)

(58) Field of Classification Search
CPC ............ G06N 3/08; G06N 3/04; G06N 3/045; G06N 3/082; G06F 9/5005
See application file for complete search history.

(56) References Cited

U.S. PATENT DOCUMENTS

| | | |
|---|---|---|
| 2016/0328644 A1 | 11/2016 | Lin et al. |
| 2018/0053091 A1 | 2/2018 | Savvides et al. |

(Continued)

FOREIGN PATENT DOCUMENTS

| | | |
|---|---|---|
| CN | 106204467 | 12/2016 |
| CN | 106991646 | 7/2017 |
| CN | 107481715 | 12/2017 |

OTHER PUBLICATIONS

Berestizshevsky et al, "Sacrificing Accuracy for Reduced Computation: Cascaded Inference Based on Softmax Confidence", arXiv:1805v1, May 28, 2018, 10 pages.

(Continued)

*Primary Examiner* — Dave Misir
(74) *Attorney, Agent, or Firm* — DORITY & MANNING P.A.

(57) ABSTRACT

A computing device is disclosed that includes at least one processor and a machine-learned model. The machine-learned model can include a plurality of blocks and one or more residual connections between two or more of the plurality of blocks. The machine-learned model can be configured to receive a model input and, in response to receipt of the model input, output a model output. The machine-learned model can be configured to perform operations including determining a resource allocation parameter that corresponds to a desired allocation of system resources to the machine-learned model at an inference time: deactivating a subset of the plurality of blocks of the machine-learned model based on the resource allocation parameter: inputting the model input into the machine-learned model (Continued)

with the subset of the plurality of blocks deactivated; and receiving, as an output of the machine-learned model, the model output.

19 Claims, 9 Drawing Sheets

(56) References Cited

U.S. PATENT DOCUMENTS

| | | | | |
|---|---|---|---|---|
| 2018/0137417 | A1* | 5/2018 | Theodorakopoulos | G06N 3/04 |
| 2018/0307894 | A1* | 10/2018 | Lim | G06V 40/16 |
| 2019/0130248 | A1* | 5/2019 | Zhong | G06N 5/04 |
| 2019/0251441 | A1* | 8/2019 | Lu | G06N 3/045 |

OTHER PUBLICATIONS

International Search Report for PCT/US2019/051870, mailed on Dec. 5, 2019, 3 pages.
Wang et al, "SkipNet: Learning Dynamic Routing in Convolutional Networks", arXiv:1711v1, Nov. 26, 2017, 10 pages.
International Preliminary Report on Patentability for Application No. PCT/US2019/051870, mailed Apr. 15, 2021, 11 pages.
Machine Translated Chinese Search Report Corresponding to Application No. 2019800567287 on Mar. 12, 2024.

* cited by examiner

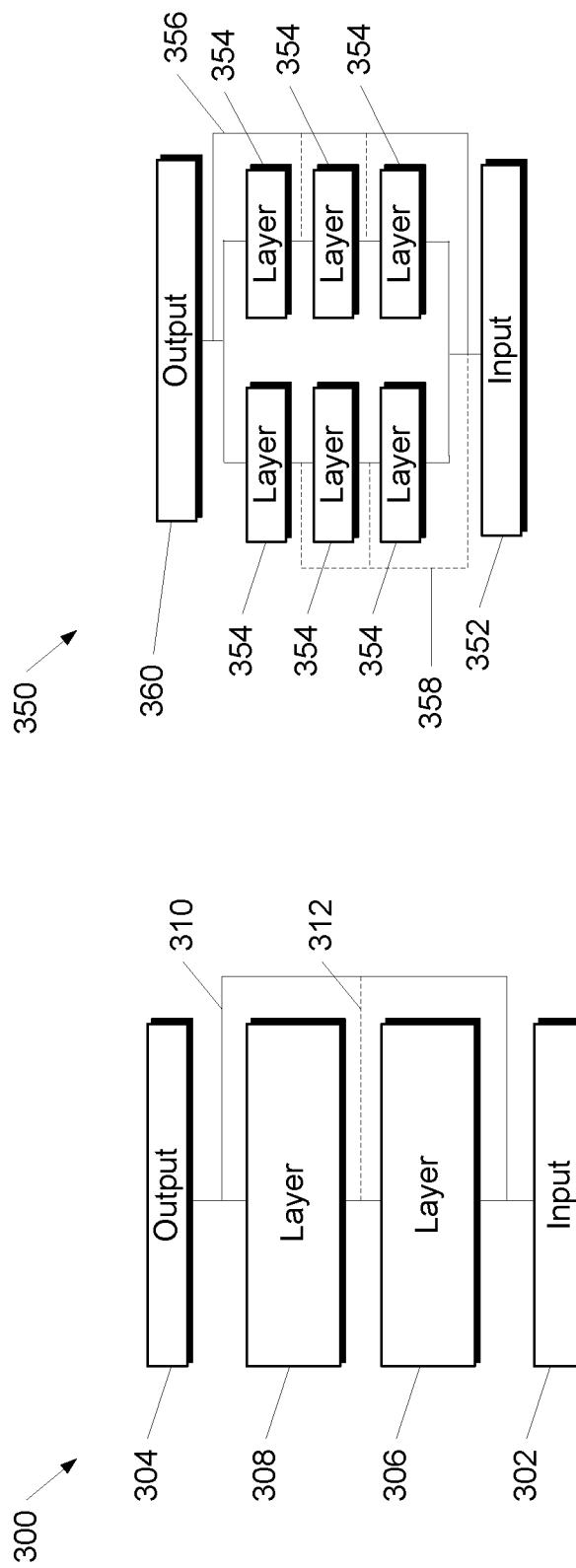

SYSTEMS AND METHODS FOR PROVIDING A MACHINE-LEARNED MODEL WITH ADJUSTABLE COMPUTATIONAL DEMAND

PRIORITY CLAIM

This application is based upon and claims the right of priority under 35 U.S.C. § 371 to International Application No. PCT/US2019/051870 filed on Sep. 19, 2019, which claims priority to and the benefit of U.S. Provisional Patent Application No. 62/739,584 filed on Oct. 1, 2018. Applicant claims priority to and the benefit of each of such applications and incorporates all such applications herein by reference in their entirety.

FIELD

The present disclosure relates generally to machine-learned models. More particularly, the present disclosure relates to systems and methods for providing a machine-learned model with adjustable computational demand.

BACKGROUND

On-device machine-learned models have recently become more prevalent. For example, deep neural networks have been deployed on "edge" devices, such as mobile phones, embedded devices, other "smart" devices, or other resource-constrained environments. Such on-device models can provide benefits, including reduced latency and improved privacy, when compared with cloud-based configurations, in which the machine-learned model is stored and accessed remotely, for example, in a server accessed via a wide area network.

However, the computational resources of such edge devices can vary significantly. Additionally, for a particular device, the amount of computational resources available at a given time for executing such an on-device, machine-learned model can vary based on a variety of factors. As such, on-device machine-learned models may exhibit poor performance, such as increased latency or delay, and/or require a suboptimal allocation of device resources.

SUMMARY

Aspects and advantages of embodiments of the present disclosure will be set forth in part in the following description, or can be learned from the description, or can be learned through practice of the embodiments.

One example aspect of the present disclosure is directed to a computing device. The computing device can include at least one processor and a machine-learned model. The machine-learned model can include a plurality of blocks and one or more residual connections between two or more of the plurality of blocks. The machine-learned model can be configured to receive a model input and, in response to receipt of the model input, output a model output. The machine-learned model can include at least one tangible, non-transitory computer-readable medium that stores instructions that, when executed by the at least one processor, cause the at least one processor to perform operations. The operations can include determining a resource allocation parameter that corresponds to a desired allocation of system resources to the machine-learned model at an inference time. The operations can include deactivating a subset of the plurality of blocks of the machine-learned model based on the resource allocation parameter. The operations can include inputting the model input into the machine-learned model with the subset of the plurality of blocks deactivated and receiving, as an output of the machine-learned model, the model output.

Another example aspect of the present disclosure is directed to a computer-implemented method to reduce computational costs associated with a machine-learned model. The method can include determining, by one or more computing devices, a resource allocation parameter that describes a desired allocation of system resources to the machine-learned model at an inference time. The method can include deactivating, by the one or more computing devices, a subset of a plurality of blocks of the machine-learned model based on the resource allocation parameter. The method can include inputting, by the one or more computing devices, an input set into the machine-learned model and receiving, by the one or more computing devices, as an output of the machine-learned model, an output set.

Another example aspect of the present disclosure is directed to a method for training a machine-learned model to be robust against deactivation of at least some of a plurality of blocks of a neural network of the machine-learned model at an inference time. The method can include iteratively training, by one or more computing devices, the machine-learned model using a training data set. The method can include deactivating, by the one or more computing devices, an iteration-specific subset of the plurality of blocks of the machine-learned model before at least one iteration of the iterative training of the machine-learned model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3A depicts an example block of layers of a machine-learned model according to example embodiments of the present disclosure.

FIG. 3B depicts another example block of layers of a machine-learned model according to example embodiments of the present disclosure.

Figure 1A:
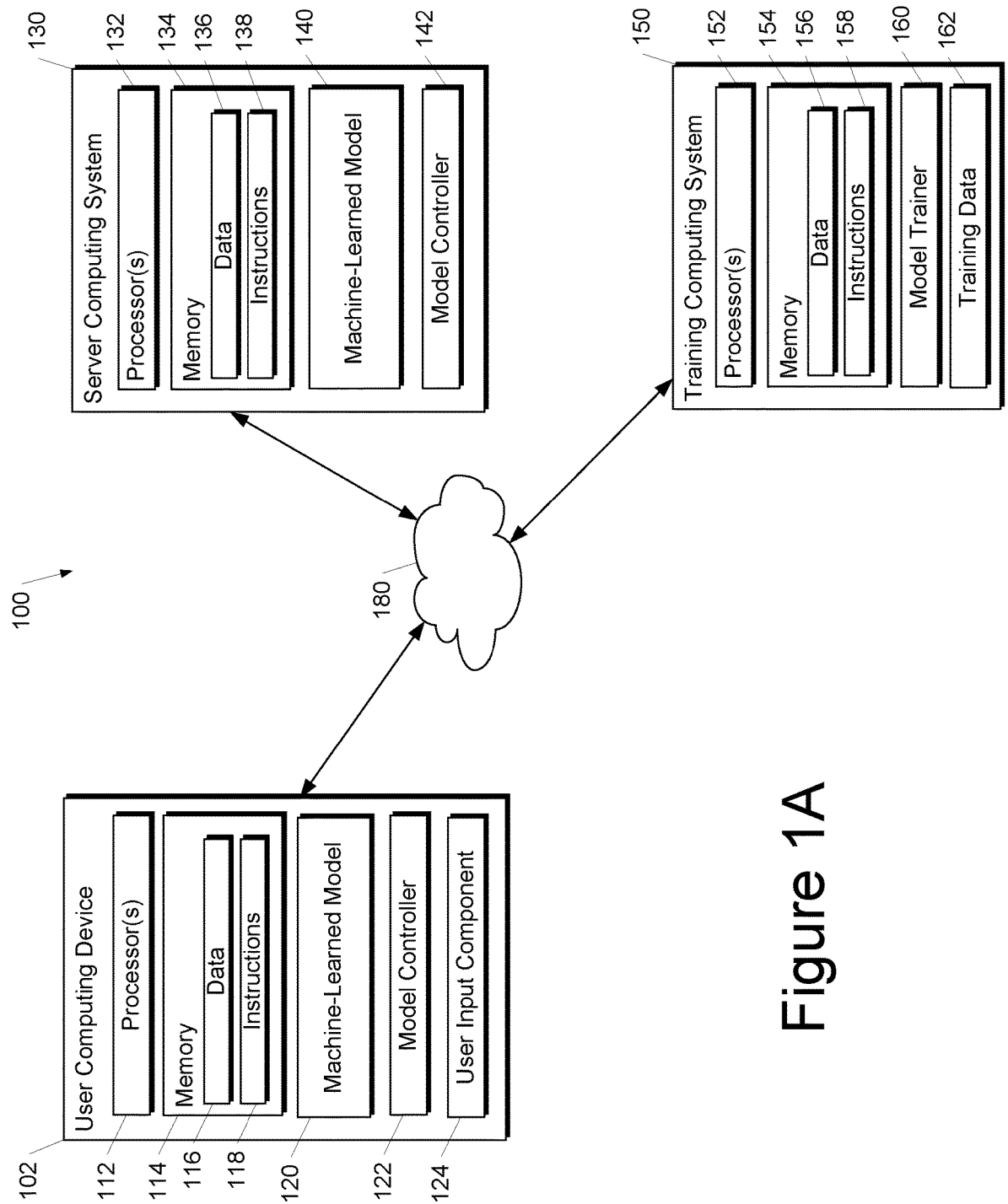
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods for providing a machine-learned model with adjustable computational demand. Example aspects of the present disclosure are directed to computing systems and related methods that include or otherwise leverage a machine-learned model that can be adapted to adjust the computational demands of executing the machine-learned model on a computational device. In some implementations, the machine-learned model can be stored and/or executed on a computing device, such as an "edge" device. Example devices include smartphones, "smart" devices, embedded devices, and any computing device that may have limiting computing power and/or access to cloud computing. Prior to an inference time, the computing device can select a subset (e.g., a set of one or more layers and/or blocks of layers) of the machine-learned model based on a resource allocation parameter that corresponds to a desired allocation of system resources to the machine-learned model at inference time. The computing device can deactivate the selected subset of the model in a manner that reduces or eliminates the computational demand associated with the deactivated portions. As a result, the total computational demand on the computing device at an inference time can be reduced. More particularly, the total computational demand on the computing device at an inference time can be intelligently controlled to match a desired allocation of system resources, where the desired allocation is based on various environmental and/or contextual factors such as, for example, one or more metrics associated with available processing power or memory of the device at the inference time and/or based on a user input. While deactivating portions of the machine-learned model can provide faster processing times, such deactivation can also reduce the quality of results output by the model. As such, a tradeoff between processing time and quality is often present. Thus, aspects of the present disclosure provide an adaptable model that can be intelligently and granularly adjusted to provide the desired tradeoff between speed and quality.

The machine-learned model can be trained to be robust against deactivation of blocks at the inference time. More specifically, during iterative training of the model, an iteration-specific subset of the blocks can be deactivated. The subset of blocks that are deactivated during training can be selected in a similar manner as those deactivated at the inference time. As a result, the model can be trained to be robust against deactivation of the blocks that are likely to be deactivated at the inference time, which can improve the quality of the output of the machine-learned model at the inference time.

Moreover, such an adaptable machine-learned model can be suitable for deployment across a range of computing devices having a variety of resource levels. Each computing device can adapt the machine-learned model as needed, for example, based on the resources of the respective computing device. Alternatively, a single machine-learned model can be trained and a variety of adapted machine-learned models can then be created and distributed based on the single, trained machine-learned model. The variety of adapted machine-learned models can demand varying levels of computational resources at the inference time. Thus, the machine-learned models according to aspects of the present disclosure can be adapted or customized according to the particular computing device that will execute the machine-learned model.

In one example, a user can request an operation, such as object recognition, that leverages an on-device machine-learned model that resides on a smartphone. Prior to executing the machine-learned model, the computing device can deactivate portions of the machine-learned model to reduce the computing resources needed to execute the machine-learned model, for example, based on context-specific considerations associated with the smartphone. Examples include a battery state, a current available processor power, and a number of currently running applications of the smartphone at the inference time. Such adaptation of the machine-learned model can reduce the time needed to execute the machine-learned model and provide the output (e.g., recognized text) to the user.

In particular, according to one aspect of the present disclosure, a computing device can include a machine-learned model that includes a plurality of blocks. Each block can include one or more layers, and each layer can include one or more nodes. For example, in some implementations, the machine-learned model can be or include a convolutional neural network. The machine-learned model can include one or more residual connections between two or more of the plurality of blocks. The residual connections can be configured to pass information to "downstream" blocks, for example, by bypassing blocks that have been deactivated. Thus, the model can include any number of blocks and any number of residual connections between various blocks. In one example, a residual connection exists between every adjacent block, while in other examples residual connections are sparse.

The computing device can be configured to determine a resource allocation parameter that corresponds to a desired allocation of system resources for the machine-learned model at an inference time. The computing device can deactivate a subset of the plurality of blocks of the machine-learned model based on the resource allocation parameter. As a result, the computational demands associated with executing the resulting machine-learned model can be reduced. For example, the reduction in the computational demand associated with executing the machine-learned model can be inversely proportional to the magnitude of the resource allocation parameter. Lastly, the computing device can be configured to input the model input into the machine-learned model with the subset of the plurality of blocks deactivated, and receive, as an output of the machine-learned model, the model output.

In some implementations, the resource allocation parameter can be determined prior to inputting the model input into the machine-learned model (e.g., prior to the inference time). The resource allocation parameter can also be determined based on a current status of the computing device. As an example, when a battery state of the computing device is low, the resource allocation parameter may correspond with a low desired allocation of system resources to the machine-learned model at the inference time to preserve the remaining battery power of the computing device. Similarly, when the currently available processor power is low and/or a large number of applications are currently running, the resource allocation parameter may correspond with a low desired allocation of system resources to avoid long processing times. Thus, the resulting machine-learned model can be adapted based on the current status of the computing device to quickly provide a solution and/or preserve resources of the computing device.

In some implementations, the user can provide an input that indicates an amount of computational resources that the user would like to allocate to the machine-learned model. As an example, the user can interact with a touch-sensitive display screen of the computing device (e.g., smartphone) to provide the input. For example, the user can input a value (e.g., via a keyboard) or adjust a slider bar (or other virtual control object) to indicate her preference for a faster result but potentially less accurate result or a slower but potentially more accurate result.

In some implementations, the machine-learned model can have a structural arrangement that provides resilience or robustness against deactivation of various blocks. More specifically, the blocks can be connected by various residual connections such that information can be passed "around" deactivated blocks to subsequent blocks or layers (e.g., to classification or other output layer(s)). As one example, the subset of the plurality of blocks can be selected such that at least one of the residual connections bypasses each block included in the subset of the plurality of blocks. Stated differently, each block included in the subset of the plurality of blocks can be positioned between at least one of the residual connections of the machine-learned model. Thus, deactivation of the subset of blocks can reduce the computational demand associated with executing the machine-learned model without rendering the machine-learned model inoperable or unacceptably degrading the quality of the output of the model.

The residual connections of the machine-learned model can have a variety of configurations. As one example, the plurality of blocks can be "densely" connected such that a residual connection is provided from an output of each block to an input of the block immediately following the next sequential block such that each block is residually connected to the block that is one block away (e.g., a connection from block 1 to block 3 skips block 2). In such an example, each block may be eligible for deactivation. As another example, residual connections can be formed between only some of the blocks. Each residual connection can skip one block or can skip multiple blocks. Residual connections can have varying connections and skip amounts within the network. In such configurations, only blocks for which residual connections are provided (e.g., blocks which can be skipped by residual connections) may be eligible for deactivation. However, aspects of the present disclosure can be applied in machine-learned models having any number of different suitable configuration of residual connections.

As used herein, "block" can refer to a group of one or more contiguous layers, and each layer can include one or more nodes. In some embodiments, the layers within a block can be arranged in a generally sequential configuration in which the output of one layer is passed to the next layer as in input. In some implementations, the machine-learned model can include a convolutional neural network, and at least one of the plurality of blocks can include a convolutional block. The convolutional block can apply at least one convolutional filter. The convolutional block can also include one or more pooling layers or other suitable layers found in convolutional neural networks. Additional residual connections can be included within the convolutional block, for example that bypass one or more of the convolutional filters. Moreover, in some implementations, the machine-learned model can include one or more fully connected layers and/or classification layers, such as a softmax layer.

The subset of blocks can be deactivated using a variety of suitable techniques. As an example, the subset of blocks can be disconnected such that information is not input into the subset of the blocks. However, deactivating the subset of blocks can include any suitable technique such that consumption of computational resources by the subset of blocks at inference time is substantially reduced or eliminated.

In some implementations, a size of the subset of the plurality of blocks can be selected based on a magnitude of the resource allocation parameter such that the size of the subset of the plurality of blocks is negatively correlated with the magnitude of the resource allocation parameter. For example, a small resource allocation parameter can result in a large number of blocks being deactivated prior to inference time. In other implementations, however, depending on the convention chosen, the size of the subset of the plurality of blocks can be positively correlated with the magnitude of the resource parameter.

In some implementations, the plurality of blocks (or a subset thereof) can be residually connected in a "residual chain" that can extend from an input end of the machine-learned model towards an output end of the machine-learned model. Deactivating the subset of the plurality of blocks of the machine-learned model can include deactivating a starting residual block within the residual chain and a residual tail portion of the residual chain. The residual tail portion can include blocks within the residual chain that extend towards the output end of the machine-learned model from the starting residual block. As such, the residual tail portion can include a contiguous string of blocks that are located "after" the starting residual block. When the residual tail portion is deactivated, the residual connections can pass information (e.g., "around" the deactivated portion) to subsequent layers or blocks. Thus, the subset of blocks can include contiguous chains of blocks within the plurality of blocks of the machine-learned model.

In some implementations, the subset of blocks can be selected in a semi-random manner that favors deactivating blocks positioned near an output end of the model over deactivating blocks positioned near an input end of the machine-learned model. For example, blocks can be selected based on a respective probability of each block. The probabilities can be assigned to the blocks and can correspond with a likelihood that each block is selected for deactivation. The respective probability of each block can be positively correlated with a respective position of each block within the neural network. More specifically, blocks located near the input end of the machine-learned model can have a low associated probability. The probabilities associated with the respective blocks can increase towards the output end. Thus, the subset of blocks can include non-contiguous blocks that can be dispersed within the plurality of blocks of the machine-learned model.

According to another aspect of the present disclosure, a method is disclosed for reducing computational costs associated with a machine-learned model. The method can include determining a resource allocation parameter that describes a desired allocation of system resources to the machine-learned model at an inference time. A subset of the plurality of blocks of the machine-learned model may be deactivated based on the resource allocation parameter. The method may include inputting the input set into the machine-learned model and receiving, as an output of the machine-learned model, the output set.

In some implementations, the method may include receiving the machine-learned model at a user computing device (e.g., an "edge" device) after deactivating the subset of the plurality of blocks (e.g., at a server computing system). The machine-learned model can be trained (e.g., at the server computing system). During training, portions of the machine-learned model can be deactivated, for example as described below, such that the machine-learned model is robust against deactivation of blocks. Before the trained machine-learned model is transmitted to a user computing device, the resource allocation parameter can be determined (e.g., at the server computing system), for example based on the computational resources of the user computing device to which the machine-learned model will be sent. A subset of the plurality of blocks of the machine-learned model can then be deactivated (e.g., at the server computing system) based on the resource allocation parameter and the adapted machine-learned model can be sent to the user computing system. The user computing system can then utilize the machine-learned model by inputting the model input and receiving, as an output of the machine-learned model, the model output.

Such implementations can provide more efficient training and distribution of machine-learned models. Instead of training a variety of similar machine-learned models of varying complexity for an array of devices that have varying levels of computational resources, a single machine-learned model can be trained. Numerous copies of the trained machine-learned model can then be adapted to require different levels of computational resources (e.g., corresponding to the various devices) by deactivating portions of the trained machine-learned model. The resulting machine-learned models can then be distributed to the array of computing devices that have varying levels of computational resources. However, it should be understood that in other implementations, each step of the above-described method can be performed by a single user computing device.

In some implementations, the subset of the plurality of blocks can be selected such that at least one of the residual connections bypasses each of the subset of the plurality of blocks, for example as described above. Similarly, in some implementations, the resource allocation parameter can be determined based on at least one of: a battery state, a current available processor power, or a number of currently running applications, for example as described above.

According to another aspect of the present disclosure, a method is disclosed for training a machine-learned model to be robust against deactivation of at least some of a plurality of blocks of a neural network of the machine-learned model at an inference time. The method can include iteratively training the machine-learned model using a training data set. The training data set can include any suitable training input data set and optionally can include a training output data set.

An example training data set can include audio files and recognized text of spoken words in the audio file. Another example training data set can include images and object recognition output that describes locations and/or labels of recognized objects portrayed in the images.

The method can include deactivating an iteration-specific subset of the plurality of blocks of the machine-learned model before at least one iteration of the iterative training of the machine-learned model. The iteration-specific subset can be selected in a variety of suitable manners. As one example, iteration-specific subset can be selected based on a respective probability associated with each block that is positively correlated with a respective position of each block within the neural network. It should be understood that the iteration-specific subset can be selected using similar methods as described above regarding deactivating the subset of the plurality of blocks based on the resource allocation parameter prior to the inference time. For example, during training, the iterative-specific subset of blocks can be selected in a semi-random manner that favors deactivating blocks positioned near an output end over deactivating blocks positioned near an input end of the machine-learned model. As such, the machine-learned model can be trained to be robust against deactivation of the blocks that are likely to be deactivated at the inference time. Such training methods can improve the quality of the output of the machine-learned model at inference time.

The systems and methods of the present disclosure provide a number of technical effects and benefits, including, for example reducing the computational resources required by a machine-learned model at inference time. Furthermore, where variants of a machine-learned model having different computational demands are desired, the storage used for machine-learned models on a device may be reduced as an adaptable machine-learned model, which can adjust its computational demands, can replace multiple machine-learned models. The described systems and methods may also reduce the computational resources required for training machine-learned models as an adaptable machine-learned model may be trained in place of multiple machine-learned models having different computational demands.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored by a server computing device that communicates with the user computing device according to a client-server relationship.

With reference now to the Figures, example embodiments of the present disclosure will be discussed in further detail.

Example Devices and Systems

FIG. 1A depicts a block diagram of an example computing system 100 that reduces computational costs associated with a machine-learned model according to example embodiments of the present disclosure. The system 100 includes a user computing device 102, a server computing system 130, and a training computing system 150 that are communicatively coupled over a network 180.

In some implementations, the user computing device 102 can be an "edge" device. Example "edge" devices include smartphones, "smart" devices, embedded devices, and any computing device that may have limiting computing power and/or access to cloud computing. The user computing device 102, however, can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned models 120. For example, the machine-learned models 120 can be or can otherwise include various machine-learned models such as neural networks (e.g., deep neural networks) or other multi-layer non-linear models. Neural networks can include convolutional neural networks, recurrent neural networks (e.g., long short-term memory recurrent neural networks), feed-forward neural networks, or other forms of neural networks. Example machine-learned models 120 are discussed with reference to FIGS. 2A through 2C.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel operations across multiple instances of the model 120).

Additionally or alternatively, one or more machine-learned models 140 can be included in or otherwise stored by the server computing system 130 that communicates with the user computing device 102 according to a client-server relationship. Thus, one or more models 120 can be stored and implemented at the user computing device 102. In some implementations, one or models 120 can be transmitted from the server computing system 130 to the user computing device 102.

The user computing device 102 can also include a model controller 122 that is configured to deactivate a subset of a plurality of blocks of the machine learned model 120, for example as described with reference to FIGS. 2A through 7. The model controller 122 can correspond with a computer program (e.g., data 116 and instructions 118) that are configured to deactivate the blocks as described herein.

The user computing device 102 can also include one or more user input component 124 that receives user input. For example, the user input component 124 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models such as neural networks (e.g., convolutional neural networks, deep recurrent neural networks, etc.) or other multi-layer non-linear models. Example models 140 are discussed with reference to FIGS. 2A through 2C.

The server computing system 130 can train the models 140 via interaction with the training computing system 150 that is communicatively coupled over the network 180. The training computing system 150 can be separate from the server computing system 130 or can be a portion of the server computing system 130.

The server computing system 130 can also include a model controller 142 that is configured to deactivate a subset of a plurality of blocks of the machine learned model 140, for example as described with reference to FIGS. 2A through 7. The model controller 122 can correspond with a computer program (e.g., data 116 and instructions 118) that are configured to deactivate the blocks as described herein.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques. The model trainer 160 can be configured to deactivate an iteration-specific subset of the plurality of blocks of the machine-learned model before at least one iteration of the iterative training of the machine-learned model, for example as described below with reference to FIG. 7. Example training techniques include backwards propagation of errors, which can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned model 140 based on a set of training data 162. The training data 162 can include, for example, model input data (e.g., images, audio, etc.), for example as described below with reference to FIGS. 2A through 2C. In some implementations, the training data 162 can be "labeled," and also include model output data (e.g., object recognition data, voice recognition data, etc.), for example as described below with reference to FIGS. 2A through 2C.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
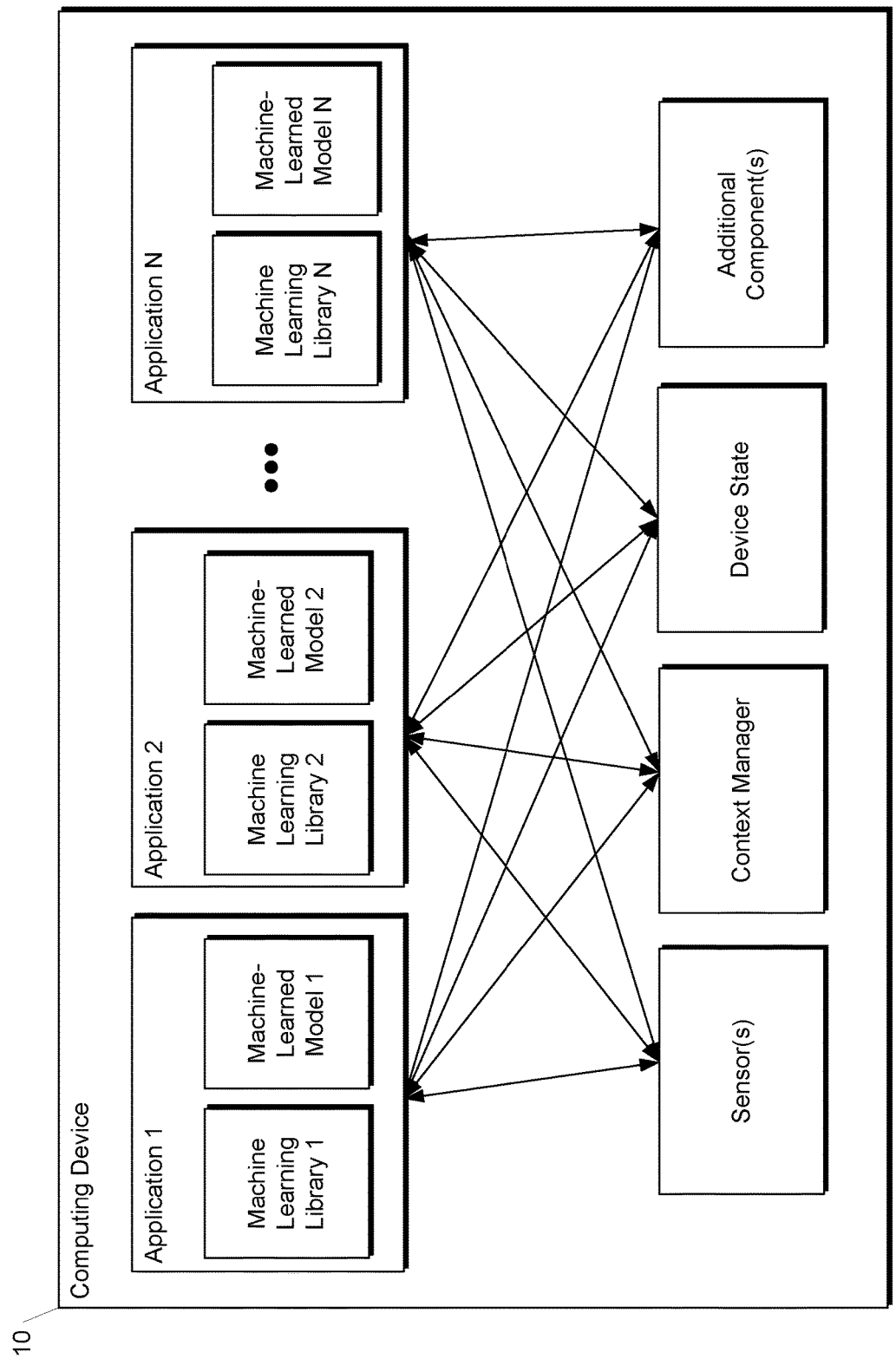
FIG. 1B depicts a block diagram of an example computing system according to example embodiments of the present disclosure.

FIG. 1B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc. In some implementations, each application can also contain its own model controller that intelligently deactivates blocks within the corresponding machine-learned model included in the application.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
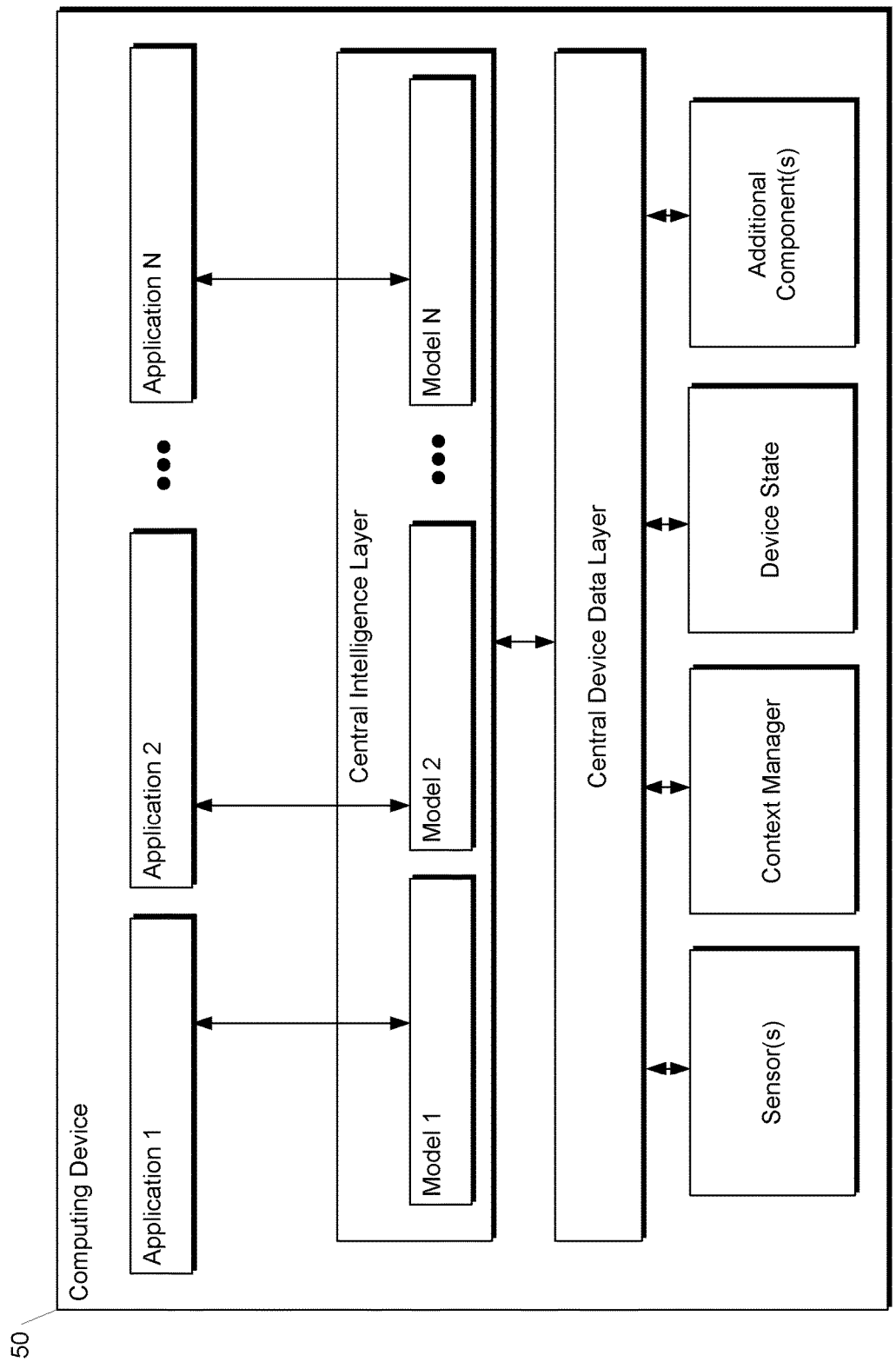
FIG. 1C depicts a block diagram of an example computing system according to example embodiments of the present disclosure.

FIG. 1C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API). In some implementations, the central intelligence layer can also contain a model controller that intelligently deactivates blocks within a machine-learned model that is provided for a given application via an API.

Example Model Arrangements

Figure 2A:
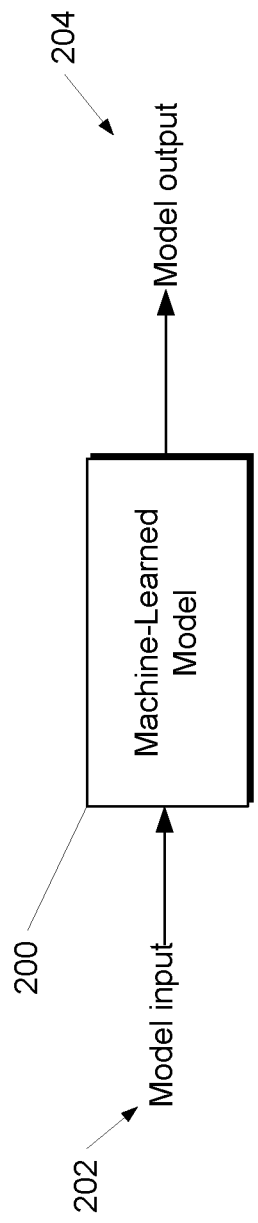
FIG. 2A depicts a machine-learned model according to example embodiments of the present disclosure.
Figure 2B:
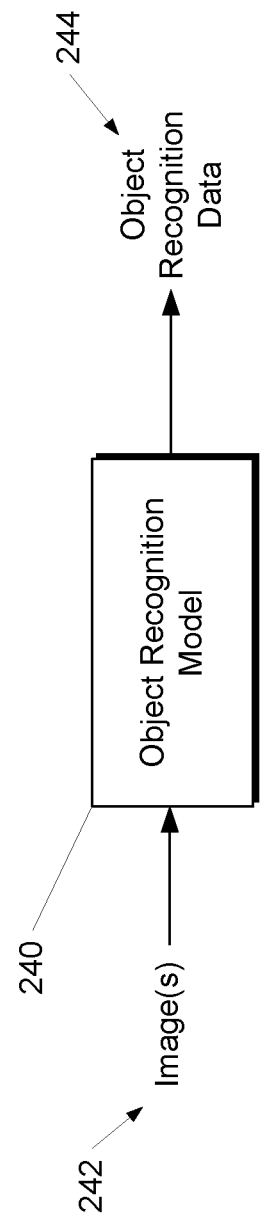
FIG. 2B depicts a machine-learned object recognition model according to example embodiments of the present disclosure.
Figure 2C:
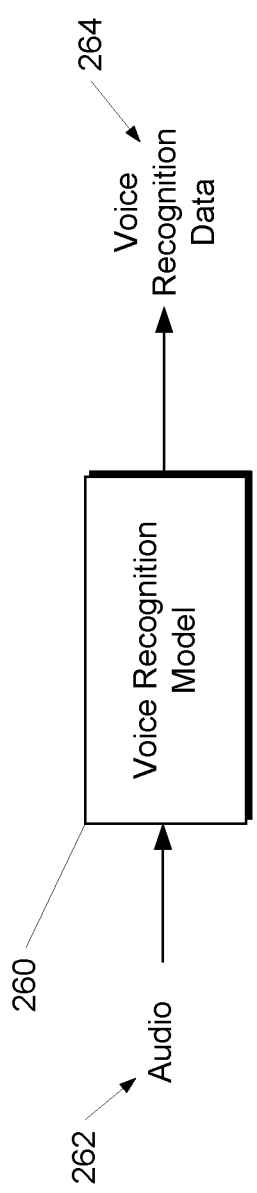
FIG. 2C depicts a machine-learned voice recognition model according to example embodiments of the present disclosure.

FIG. 2A depicts a block diagram of an example machine-learned model 200 according to example embodiments of the present disclosure. In some implementations, the machine-learned model 200 is trained to receive a set of input data 202 and, as a result of receipt of the input data 202, provide output data 204. The machine-learned model can trained to perform a wide variety of functions. As an example, referring to FIG. 2B, an object recognition machine-learned model 240 can receive one or more images 242 (e.g., a single image or a video file), and output object recognition data 244 (e.g., that describes locations and/or labels of recognized objects portrayed in in the images). As another example, referring to FIG. 2C, a voice recognition machine-learned model 260 can be trained to receive an audio file 262 and output voice recognition data 264 (e.g., that includes recognized text of spoken words in the audio file). However, it should be understood that aspects of the present disclosure can be applied with machine-learned models 200 that are configured to perform any suitable function, including functions performed by on-device machine-learned models (e.g., text prediction, personal assistant functions, etc.).

Generally, the present disclosure is directed to systems and methods for providing a machine-learned model 200 with adjustable computational demand. Example aspects of the present disclosure are directed to computing systems and related methods that include or otherwise leverage a machine-learned model that can be adapted to adjust the computational demands of executing the machine-learned model on a computational device. In some implementations, the machine-learned model can be stored and/or executed on a computing device, such as an "edge" device. Example devices include smartphones, "smart" devices, embedded devices, and any computing device that may have limiting computing power and/or access to cloud computing. Prior to an inference time, the computing device can select a subset (e.g., a set of one or more layers and/or blocks of layers) of the machine-learned model based on a resource allocation parameter that that corresponds to a desired allocation of system resources to the machine-learned model at inference time. The computing device can deactivate the selected subset of the model in a manner that reduces or eliminates the computational demand associated with the deactivated portions. As a result, the total computational demand on the computing device at an inference time can be reduced. More particularly, the total computational demand on the computing device at an inference time can be intelligently controlled to match a desired allocation of system resources, where the desired allocation is based on various environmental and/or contextual factors such as, for example, one or more metrics associated with available processing power or memory of the device at the inference time and/or based on a user input. While deactivating portions of the machine-learned model can provide faster processing times, such deactivation can also reduce the quality of results output by the model. As such, a tradeoff between processing time and quality is often present. Thus, aspects of the present disclosure provide an adaptable model that can be intelligently and granularly adjusted to provide the desired tradeoff between speed and quality.

The machine-learned model can be trained to be robust against deactivation of blocks at the inference time. More specifically, during iterative training of the model, an iteration-specific subset of the blocks can be deactivated. The subset of blocks that are deactivated during training can be selected in a similar manner as those deactivated at the inference time. As a result, the model can be trained to be robust against deactivation of the blocks that are likely to be deactivated at the inference time, which can improve the quality of the output of the machine-learned model at the inference time.

Moreover, such an adaptable machine-learned model can be suitable for deployment across a range of computing devices having a variety of resource levels. Each computing device can adapt the machine-learned model as needed, for example, based on the resources of the respective computing device. Alternatively, a single machine-learned model can be trained and a variety of adapted machine-learned models can then be created and distributed based on the single, trained machine-learned model. The variety of adapted machine-learned models can demand varying levels of computational resources at the inference time. Thus, the machine-learned models according to aspects of the present disclosure can be adapted or customized according to the particular computing device that will execute the machine-learned model.

In one example, a user can request an operation, such as object recognition, that leverages an on-device machine-learned model that resides on a smartphone. Prior to executing the machine-learned model, the computing device can deactivate portions of the machine-learned model to reduce the computing resources needed to execute the machine-learned model, for example, based on context-specific considerations associated with the smartphone. Examples include a battery state, a current available processor power, and a number of currently running applications of the smartphone at the inference time. Such adaptation of the machine-learned model can reduce the time needed to execute the machine-learned model and provide the output (e.g., recognized text) to the user.

As used herein, "block" can refer to a group of one or more contiguous layers, and each layer can include one or more nodes. In some embodiments, the layers within a block can be arranged in a generally sequential configuration in which the output of one layer is passed to the next layer as in input. In some implementations, the machine-learned model can include a convolutional neural network, and at least one of the plurality of blocks can include a convolutional block. The convolutional block can apply at least one convolutional filter. The convolutional block can also include one or more pooling layers or other suitable layers found in convolutional neural networks. Additional residual connections can be included within the convolutional block, for example that bypass one or more of the convolutional filters. Moreover, in some implementations, the machine-learned model can include one or more fully connected layers and/or classification layers, such as a softmax layer.

For example, referring to FIG. 3A, an example block 300 is shown. The blocks included in the models described herein can be as shown in example block 300 and/or can have other, different configurations/structures than example block 300. The block 300 can have an input 302, an output 304, and include one or more layers 306, 308. Each layer 306, 308 can include one or more nodes. A residual connection 310 can be configured to pass information from the input 302 to the output 304 of the block 300 (e.g., "around" the layers 306, 308 of the block 300). In some implementations, one or more "internal" residual connections 312 can be provided that pass information around fewer than all of the layers 306, 308 of the block 300. For example, the internal residual connection 312 can pass information around layer 306 or around layer 308.

FIG. 3B illustrates another example block 350 that includes "parallel" structures. For example, the block 350 can include multiple layers 354 configured as convolutional filters or other types of parallel neural network structures. One or more residual connections 356 can be configured to pass information from the input 352 to the output 360 of the block 350. Additionally, "internal" residual connections 358 can be configured to pass information around one or more individual layers 354 of the block 350.

Figure 4:
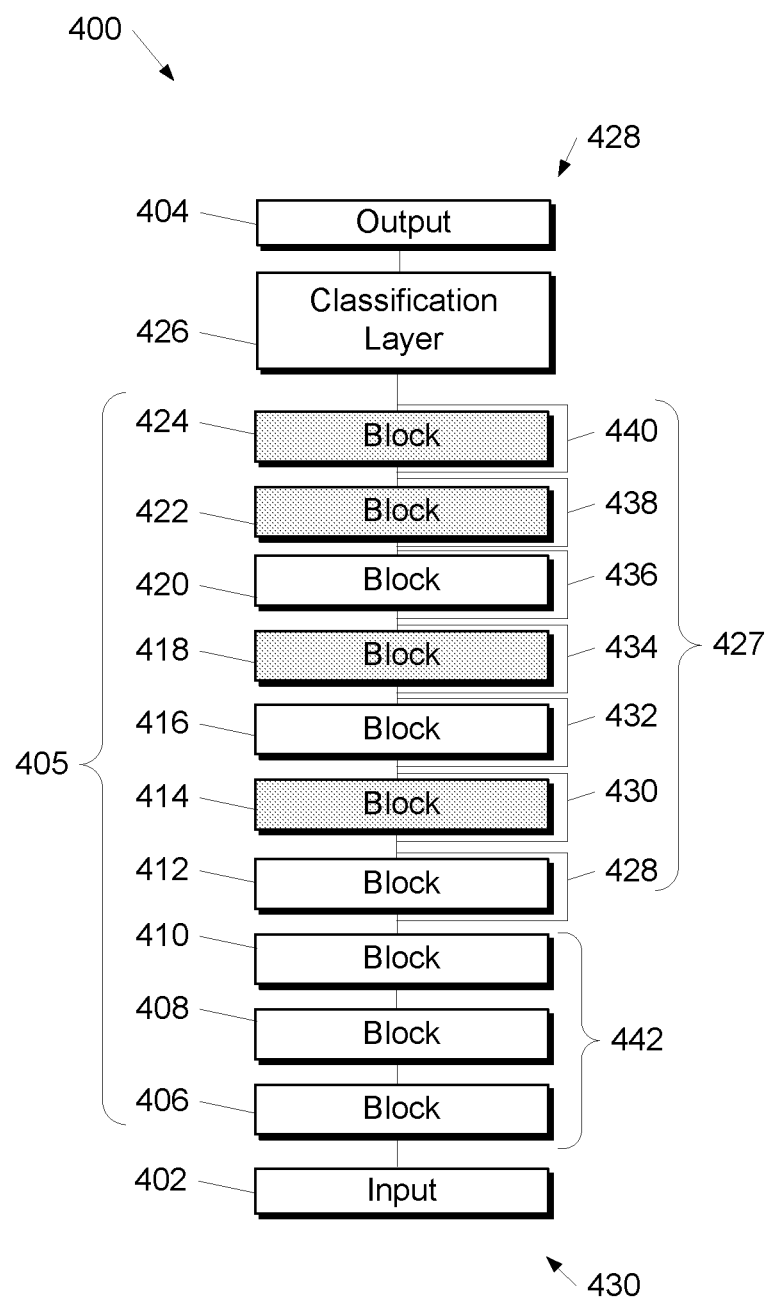
FIG. 4 depicts an example machine-learned model in which a subset of a plurality of blocks has been deactivated according to example embodiments of the present disclosure.

FIG. 4 illustrates an example machine-learned model 400 having an input 402, an output 404, and a plurality of blocks 405. The machine-learned model 400 can correspond with one or more of the machine-learned models 200, 240, 260 described above with reference to FIGS. 2A through 2C. The machine-learned model 400 may also include one or more fully connected layers and/or classification layers 426, such as a softmax layer. The blocks 405 can generally be arranged in a linear configuration, in which an output of a first block 406 is input into a second block 408, and an output of a second block 408 is input into a third block 410 and so forth. An output of a last block 424 can be input into the classification layer 426. An output of the classification layer 426 can correspond with the output 404 of the model 400.

The machine-learned model 400 can include one or more residual connections 427 between two or more of the plurality of blocks 406-424. The residual connections 427 can be configured to pass information to "downstream" blocks, for example, by bypassing certain blocks. Thus, the model can include any number of blocks and any number of residual connections 427 between various blocks 405.

A computing device (e.g., the device 102 or the system 130 shown in FIG. 1A) can be configured to determine a resource allocation parameter that corresponds to a desired allocation of system resources for the machine-learned model 400 at an inference time. The computing device can deactivate a subset of the plurality of blocks 405 of the machine-learned model 400 based on the resource allocation parameter. In the example illustrated in FIG. 4, the subset of the plurality of blocks 405 includes blocks 414, 418, 422, 424. As a result, the computational demands associated with executing the resulting machine-learned model 400 can be reduced. For example, the reduction in the computational demand associated with executing the machine-learned model 400 can be inversely proportional to the magnitude of the resource allocation parameter. Lastly, the computing device can be configured to input the model input 402 into the machine-learned model 400 with the subset of the plurality of blocks 405 (e.g., blocks 414, 418, 422, 424) deactivated, and receive, as an output of the machine-learned model, the model output 404.

In some implementations, the computing device can select blocks for deactivation at least in part based on the amount of computational resources associated with executing each respective block in the machine-learned model 400. More specifically, the resource allocation parameter can correspond with a maximum target resource allocation quantity for the machine-learned model. As examples, the maximum target resource allocation quantity can correspond with a percentage of a total processor capability, a percentage of total available memory (e.g., random access memory), or any other suitable metric describing the use of computational resources. A respective resource consumption quantity associated with each block can vary, for example, based on the number and/or type of layers and/or nodes in each block. The computing device can be configured to select blocks based on the respective resource consumption quantity (e.g., expected computational demand) of each block to adjust the resources required to execute the machine-learned model to less than the total target resource allocation quantity. Thus, the computing device can be configured to intelligently select blocks for deactivation to such that the resulting model 400 demands less than the maximum target resource allocation quantity of resources at the inference time.

For example, given knowledge of the respective resource consumption quantity associated with each block and the total target resource allocation, the computing device can perform one or more optimization techniques to select which blocks to deactivate. For example, the computing device can minimize a difference between an achieved resource allocation and a target resource allocation by iteratively searching for combinations of blocks to deactivate. In another example, a look up table that correlates resource allocation parameter values with respective subsets of blocks to deactivate can be stored in the memory of the computing device and accessed at inference time to determine which blocks to deactivate. In yet another example, a variable number of the "final" blocks in the model can simply be deactivated, where the variable number is a function of the resource allocation parameter. Thus, for example, increasing numbers of the "final" blocks in the model can be deactivated as the resource allocation parameter increases.

Referring still to FIG. 4, to provide an example, blocks 406-416 may have respective resource consumption quantities that each equal 10 units. Blocks 418-424 may have respective resource consumption quantities that equal 20 units. In this example, if the total target resource allocation equals 75 units, the computing device may select the shaded blocks 414, 418, 422, 424. The sum of the respective resource consumption quantities of the remaining blocks 406-412, 416, 420 equals 70, which is less than the total target resource allocation of 75 units.

In some implementations, the resource allocation parameter can be determined prior to inputting the model input 402 into the machine-learned model 400 (e.g., prior to the inference time). The resource allocation parameter can also be determined based on a current status of the computing device. As an example, when a battery state of the computing device is low, the resource allocation parameter may correspond with a low desired allocation of system resources to the machine-learned model 400 at the inference time to preserve the remaining battery power of the computing device. As yet another example, the current status of the computing device can include a mode (e.g., battery saver mode) of the computing device. When the computing device is in the battery saver mode, the resource allocation parameter may correspond with a low desired allocation of system resources to the machine-learned model 400 at the inference time to reduce the battery power used at inference time. Similarly, when the currently available processor power is low and/or a large number of applications are currently running, the resource allocation parameter may correspond with a low desired allocation of system resources to avoid long processing times. Thus, the resulting machine-learned model 400 can be adapted based on the current status of the computing device to quickly provide a solution and/or preserve resources of the computing device.

In some implementations, the user can provide an input that indicates an amount of computational resources that the user would like to allocate to the machine-learned model 400. As an example, with reference to FIG. 1A, the user can interact with a user input component 124 (e.g., a touch-sensitive display screen) of the computing device 102 (e.g., smartphone) to provide the input. For example, the user can input a value (e.g., via a keyboard) or adjust a slider bar (or other virtual control object) to indicate her preference for a faster result but potentially less accurate result or a slower but potentially more accurate result.

Referring again to FIG. 4, in some implementations, the machine-learned model 400 can have a structural arrangement that provides resilience or robustness against deactivation of various blocks. More specifically, the blocks of the model 400 can be connected by various residual connections 427 such that information can be passed "around" deactivated blocks 414, 418, 422, 424 to subsequent blocks or layers (e.g., to the classification layer 524 or other output layer(s)). As one example, the subset of the plurality of blocks 405 can be selected such that at least one of the residual connections 427 bypasses each blocks 414, 418, 422, 424 included in the subset of the plurality of blocks 405. Stated differently, each of the blocks 414, 418, 422, 424 included in the subset of the plurality of blocks 405 can be positioned between at least one of the residual connections 427 of the machine-learned model. Thus, deactivation of the subset of blocks 414, 418, 422, 424 can reduce the computational demand associated with executing the machine-learned model 400 without rendering the machine-learned model inoperable or unacceptably degrading the quality of the output of the model 400.

The residual connections of the machine-learned model 400 can have a variety of configurations. For example, residual connections 427 can be formed between only some of the blocks 405, for example as illustrated in FIG. 4. Each residual connection 427 can skip a single block, for example as illustrated in FIG. 4. In other implementations, the residual connections can skip multiple blocks. Residual connections can have varying connections and skip amounts within the network. In such configurations, only blocks for which residual connections are provided (e.g., blocks which can be skipped by residual connections) may be eligible for deactivation. However, aspects of the present disclosure can be applied in machine-learned models having any number of different suitable configurations of residual connections.

For example, referring again to FIG. 4, the residual connections 427 can be formed between only blocks 412-424. Other blocks 406, 408, 410 may not have associated residual connections. In this example, only the blocks 412-424 having associated residual connections 427 may be eligible for deactivation.

In some implementations, the subset of blocks 405 can be selected in a semi-random manner that favors deactivating blocks positioned near an output end 428 (adjacent the output 404) of the machine-learned model 400 over deactivating blocks positioned near an input end 430 (adjacent the input 402) of the machine-learned model 400. For example, certain of the blocks 405 can be selected based on a respective probability of each block. The probabilities can be assigned to the blocks and can correspond with a likelihood that each block is selected for deactivation. The respective probability of each of the blocks 405 can be positively correlated with a respective position of each of the blocks 405 within the neural network. More specifically, the blocks located near the input end 430 of the machine-learned model 400 can have a low associated probability. The probabilities associated with the respective blocks 405 can increase towards the output end 428. Thus, the subset of blocks 405 can include non-contiguous blocks 414, 418, 422, 424 that can be dispersed within the plurality of blocks 405 of the machine-learned model 400, for example as illustrated in FIG. 4.

For instance, referring to FIG. 4, blocks 412, 414, 416 may have relatively low respective associated probabilities (e.g., less than 25%); blocks 418, 420 may have medium respective associated probabilities (e.g., 25% to 50%); and blocks 422, 424 may have high respective associated probabilities (e.g., greater than 50%). The computing device can then select blocks for deactivation based on their respective probabilities. As a result, the blocks selected for deactivation may be concentrated towards the output end 428 of the machine-learned model 400, for example as illustrated in FIG. 4.

Figure 5:
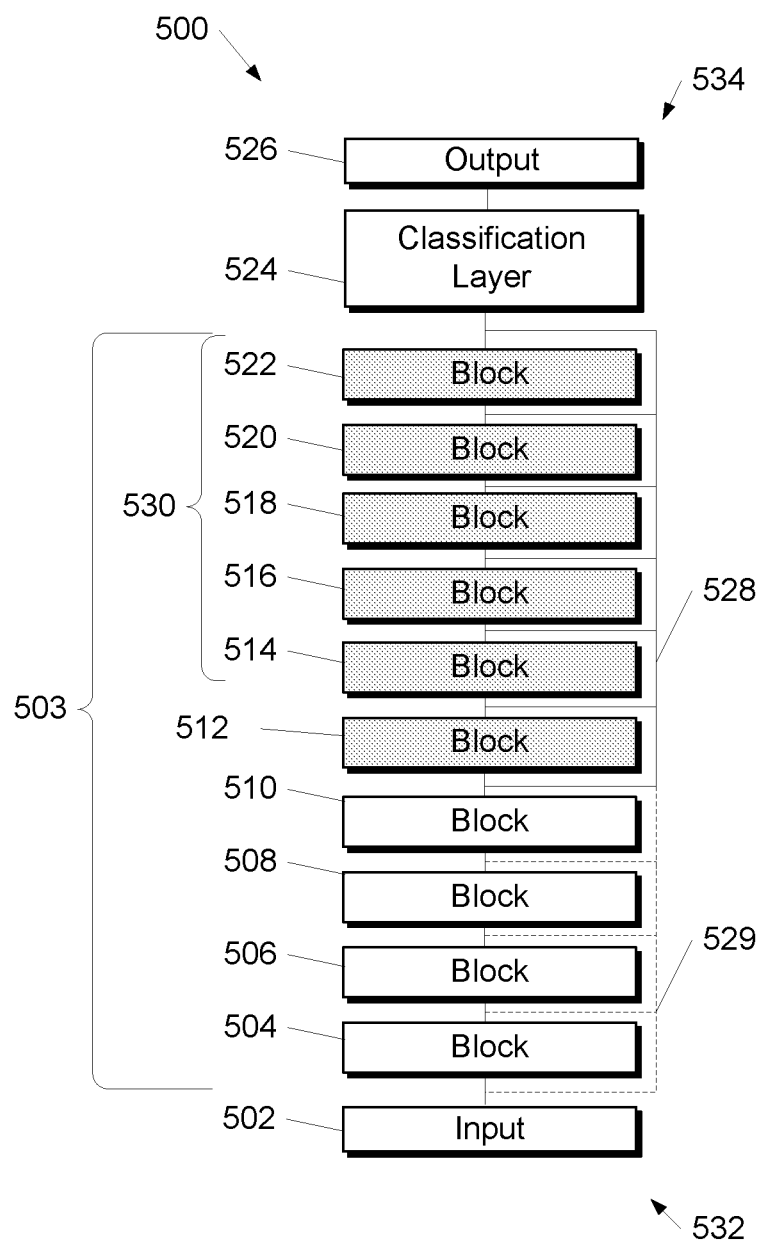
FIG. 5 depicts another example machine-learned model in which a subset of a plurality of blocks has been deactivated according to example embodiments of the present disclosure.

Referring to FIG. 5, in some implementations, the plurality of blocks 503 can be "densely" connected such that residual connections 528, 529 are provided from an output of each block to an input of the block immediately following the next sequential block such that each block is residually connected to the block that is one block away (e.g., a connection from an output of a first block 504 to an input of a third block 508 skips a second block 506). In such an example, each of the blocks 503 may be eligible for deactivation.

However, as indicated above, the subset of the plurality of blocks 503 can be selected such that at least one of the residual connections 528, 529 bypasses each block 512, 530 included in the subset of the plurality of blocks 503. Stated differently, each block 512, 530 included in the subset of the plurality of blocks 503 can be positioned between at least one of the residual connections 528, 529 of the machine-learned model 500. Thus, the eligibility of various blocks for deactivation can depend on the arrangement of the residual connections 528, 529. For instance, referring to FIG. 5, if all residual connections 528, 529 shown were present, then each of the blocks 503 would be eligible for deactivation in any combination. However, if the residual connections 529 that are shown in dotted lines were not present, then only the shaded blocks 512, 530 would be eligible for deactivation.

In some implementations, the plurality of blocks (or a subset thereof) can be residually connected in a "residual chain" (e.g., blocks 503) that can extend from an input end 532 of the machine-learned model 500 towards an output end 534 of the machine-learned model 500. Deactivating the subset of the plurality of blocks of the machine-learned model 500 can include deactivating a starting residual block 512 within the residual chain and a residual tail portion 530 of the residual chain. The residual tail portion 530 can include blocks (e.g., blocks 514-522) that are within the residual chain and extend towards the output end 534 of the machine-learned model 500 from the starting residual block 512. As such, the residual tail portion 530 can include a contiguous string of blocks 514-522 that are located "after" the starting residual block 512. When the residual tail portion 530 is deactivated, the residual connections 528 can pass information (e.g., "around" the deactivated portion 512, 530) to subsequent layers or blocks (e.g., to the classification layer 524). Thus, the subset of blocks 512, 530 can include contiguous chains of blocks within the plurality of blocks 503 of the machine-learned model 500.

Example Methods

Figure 6:
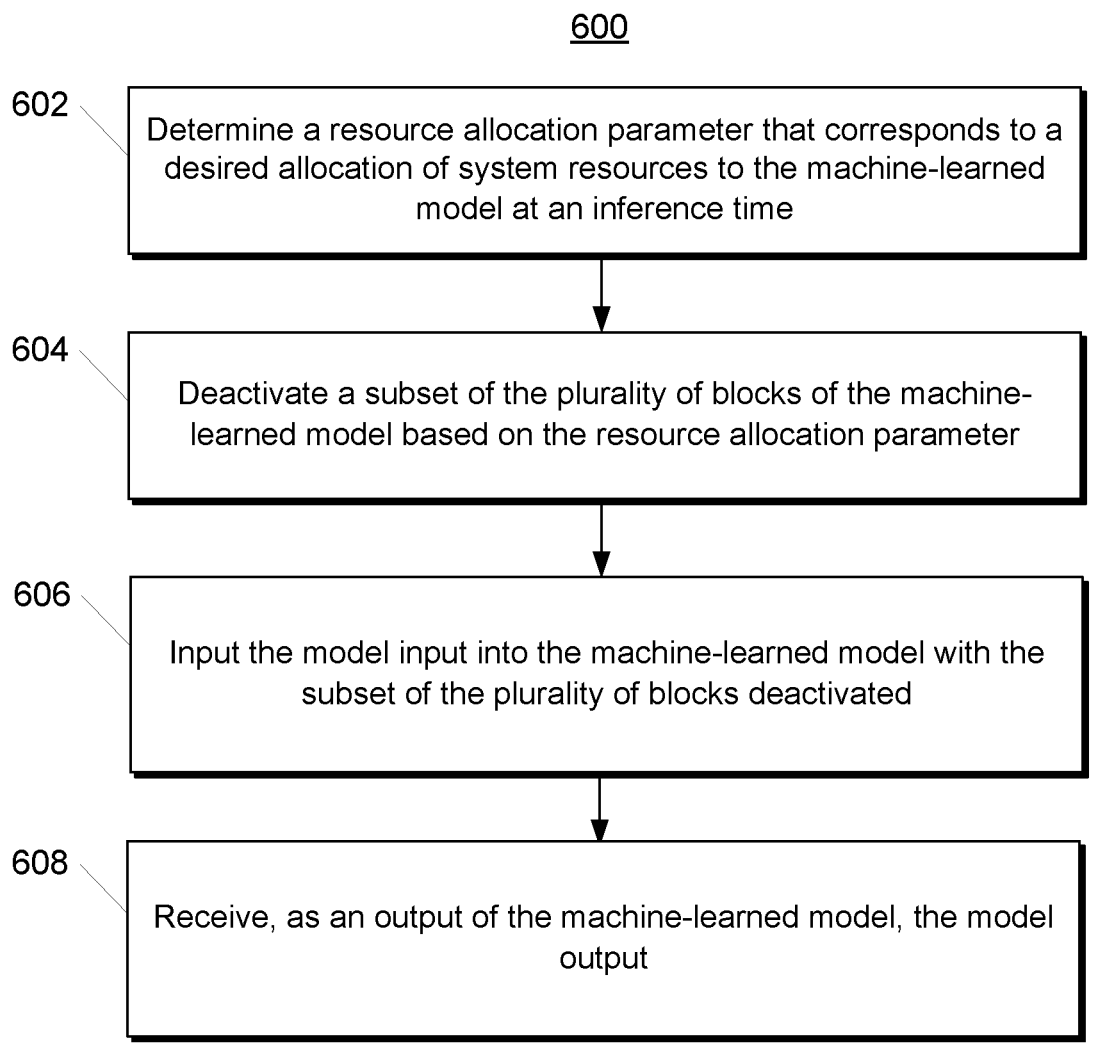
FIG. 6 depicts a flow chart diagram of an example method to reduce computational costs associated with a machine-learned model according to example embodiments of the present disclosure.

FIG. 6 depicts a flow chart diagram of an example method to reduce computational costs associated with a machine-learned model according to example embodiments of the present disclosure according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At (602), the method 600 can include determining a resource allocation parameter that corresponds to a desired allocation of system resources to the machine-learned model at an inference time. In some implementations, the resource allocation parameter can be determined prior to inputting the model input into the machine-learned model (e.g., prior to the inference time). The resource allocation parameter can also be determined based on a current status of the computing device. As an example, when a battery state of the computing device is low, the resource allocation parameter may correspond with a low desired allocation of system resources to the machine-learned model at the inference time to preserve the remaining battery power of the computing device. Similarly, when the currently available processor power is low and/or a large number of applications are currently running, the resource allocation parameter may correspond with a low desired allocation of system resources to avoid long processing times. Thus, the resulting machine-learned model can be adapted based on the current status of the computing device to quickly provide a solution and/or preserve resources of the computing device.

In some implementations, the user can provide an input that indicates an amount of computational resources that the user would like to allocate to the machine-learned model. As an example, the user can interact with a touch-sensitive display screen of the computing device (e.g., smartphone) to provide the input. For example, the user can input a value (e.g., via a keyboard) or adjust a slider bar (or other virtual control object) to indicate her preference for a faster result but potentially less accurate result or a slower but potentially more accurate result.

At (604), the method can include deactivating a subset of the plurality of blocks of the machine-learned model based on the resource allocation parameter. The subset of blocks can be deactivated using a variety of suitable techniques. As an example, the subset of blocks can be disconnected such that information is not input into the subset of the blocks. As another example, deactivating the subset can include adjusting respective activation functions associated with the subset of blocks. The activation functions can be adjusted such that the output of each node is set to a constant value, such as one or zero. Deactivating the subset of blocks can include any suitable technique such that consumption of computational resources by the subset of blocks at inference time is substantially reduced or eliminated.

In some implementations, a size of the subset of the plurality of blocks can be selected based on a magnitude of the resource allocation parameter such that the size of the subset of the plurality of blocks is negatively correlated with the magnitude of the resource allocation parameter. For example, a small resource allocation parameter can result in a large number of blocks being deactivated prior to inference time. In other implementations, however, depending on the convention chosen, the size of the subset of the plurality of blocks can be positively correlated with the magnitude of the resource parameter.

In some implementations, the computing system can select blocks for deactivation at least in part based on the amount of computational resources associated with executing each respective block in the machine-learned model, for example as explained above with reference to FIG. 4.

At (606), the method 600 may include inputting the model input into the machine-learned model with the subset of the plurality of blocks deactivated, for example as described with reference to FIGS. 1A through 2C.

At (608), the method 600 may include receiving, as an output of the machine-learned model, the model output, for example as described with reference to FIGS. 1A through 2C.

Figure 7:
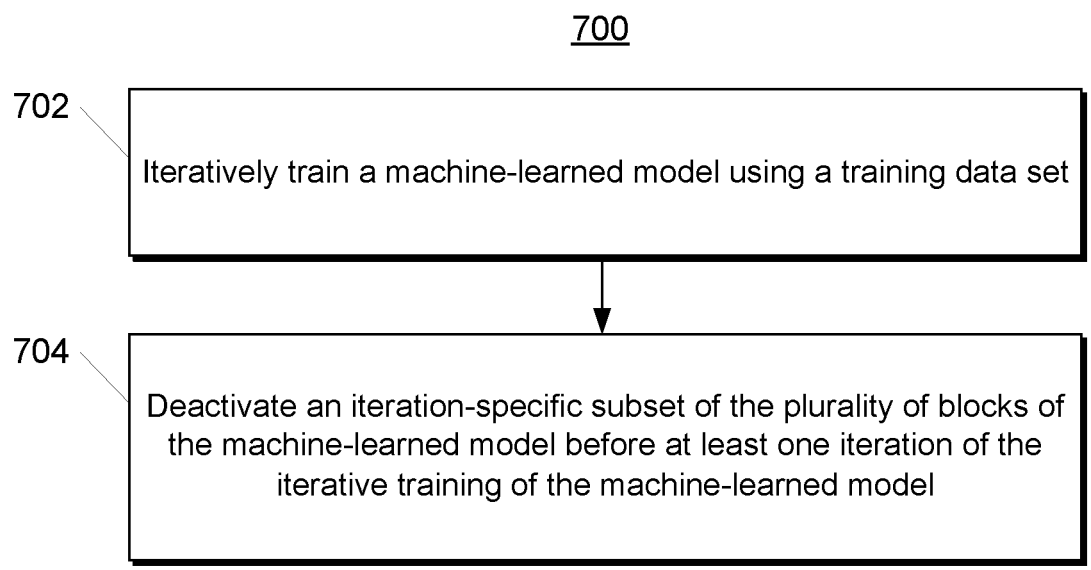
FIG. 7 depicts a flow chart diagram of an example method for training a machine-learned model to be robust against deactivation of at least some of a plurality of blocks of a neural network of the machine-learned model at an inference time.

FIG. 7 depicts a flow chart diagram of an example method for training a machine-learned model to be robust against deactivation of at least some of a plurality of blocks of a neural network of the machine-learned model at an inference time. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At (702), the method 700 can include iteratively training the machine-learned model using a training data set (e.g., training data 162). The training data set can include any suitable training input data set and optionally can include a training output data set. An example training data set can include audio files and recognized text of spoken words in the audio file. Another example training data set can include images and object recognition output that describes locations and/or labels of recognized objects portrayed in the images.

At (704), the method 700 can include deactivating an iteration-specific subset of the plurality of blocks of the machine-learned model before at least one iteration of the iterative training of the machine-learned model. The iteration-specific subset can be selected in a variety of suitable manners. As one example, the iteration-specific subset can be selected based on a respective probability associated with each block that is positively correlated with a respective position of each block within the neural network. It should be understood that the iteration-specific subset can be selected using similar methods as described above regarding deactivating the subset of the plurality of blocks based on the resource allocation parameter prior to the inference time, for example with reference to FIGS. 4 and 5. Referring again to FIG. 4, during training, the iterative-specific subset of blocks can be selected in a semi-random manner that favors deactivating blocks positioned near an output end over deactivating blocks positioned near an input end of the machine-learned model. For instance, in a first iteration, a first iteration-specific subset of blocks (e.g., shaded blocks 414, 418, 422, and 424) could be deactivated; in a second iteration, a second iteration-specific subset of blocks could be deactivated (e.g., blocks 412, 416, 418, and 422); in a third iteration, a third iteration-specific subset of blocks (e.g., blocks 408, 414, and 424) could be deactivated; and so forth. As another example, referring again to FIG. 5, in a first iteration, a first iteration-specific subset of blocks (e.g., starting residual block 512 and the associated residual tail portion 530) could be deactivated. In a second iteration, a different block (e.g., block 518) could be selected as the starting residual block such that a second iteration-specific subset of blocks (e.g., blocks 518, 520, 522) are deactivated. In a third iteration, yet another block (e.g., block 508) could be selected as the starting residual block, such that a third iteration-specific subset of blocks (e.g., blocks 508-522) are deactivated, and so forth. As such, the machine-learned model can be trained to be robust against deactivation of the blocks that are likely to be deactivated at the inference time. Such training methods can improve the quality of the output of the machine-learned model at inference time.

The systems and methods of the present disclosure provide a number of technical effects and benefits, including, for example reducing the computational resources required by a machine-learned model at inference time. Furthermore, where variants of a machine-learned model having different computational demands are desired, the storage used for machine-learned models on a device may be reduced as an adaptable machine-learned model, which can adjust its computational demands, can replace multiple machine-learned models. The described systems and methods may also reduce the computational resources required for training machine-learned models as an adaptable machine-learned model may be trained in place of multiple machine-learned models having different computational demands.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing device, comprising:
at least one processor;
a machine-learned model comprising a plurality of blocks and one or more residual connections between two or more of the plurality of blocks, wherein the machine-learned model is configured to receive a model input and, in response to receipt of the model input, output a model output, wherein the plurality of blocks has a first resource consumption quantity;
a random access memory (RAM);
at least one tangible, non-transitory computer-readable medium that stores:
a table that correlates a plurality of resource allocation parameter values with a respective plurality of subsets of blocks to deactivate; and
instructions that, when executed by the at least one processor, cause the at least one processor to perform operations, the operations comprising:
performing, by a model controller using a resource allocation parameter that corresponds to an allocation of system resources to the machine-learned model at an inference time, a lookup on the table to determine a subset of the plurality of blocks to deactivate;
deactivating, by the model controller, based on the resource allocation parameter, the subset of the plurality of blocks to obtain a deactivated subset of the plurality of blocks and a remaining subset of the plurality of blocks that does not include the deactivated subset, wherein the remaining subset of the plurality of blocks has a second resource consumption quantity that is less than the first resource consumption quantity;
loading, into the RAM, the remaining subset of the plurality of blocks to instantiate an adapted machine-learned model without the deactivated subset of the plurality of blocks; and
after the loading, into the RAM, the remaining subset of the plurality of blocks to instantiate the adapted machine-learned model without the deactivated subset of the plurality of blocks:
inputting the model input into the adapted machine-learned model; and
receiving, as an output of the adapted machine-learned model, the model output.

2. The computing device of claim 1, wherein the deactivated subset of the plurality of blocks are selected such that at least one of the residual connections bypasses each of the subset of the plurality of blocks.

3. The computing device of claim 1, wherein each of the deactivated subset of the plurality of blocks is positioned between at least one of the residual connections of the adapted machine-learned model.

4. The computing device of claim 1, wherein the resource allocation parameter is determined based on one or more of: a battery state, a mode of the computing device, a current available processor power, or a number of currently running applications.

5. The computing device of claim 1, wherein determining the resource allocation parameter comprises receiving an input from a user of the computing device.

6. The computing device of claim 1, wherein the deactivated subset is deactivated based on a respective resource consumption quantity of each block of the deactivated subset.

7. The computing device of claim 1, wherein:
at least two of the plurality of blocks are residually connected in a residual chain; and
deactivating the deactivated subset of the plurality of blocks of the machine-learned model comprises deactivating a starting residual block and a residual tail portion of the residual chain.

8. The computing device of claim 7, wherein:
the residual chain extends from an input end of the machine-learned model towards an output end of the machine-learned model; and
the residual tail portion comprises blocks within the residual chain that extend towards the output end of the machine-learned model from the starting residual block.

9. The computing device of claim 1, wherein deactivating the deactivated subset of the plurality of blocks comprises selecting blocks based on a respective probability of each block that is positively correlated with a respective position of each block within the machine-learned model.

10. The computing device of claim 1, further comprising selecting a size of the deactivated subset of the plurality of blocks for deactivation based on a magnitude of the resource allocation parameter such that the size of the deactivated subset of the plurality of blocks is negatively correlated with the magnitude of the resource allocation parameter.

11. The computing device of claim 1, wherein deactivating the deactivated subset of the plurality of blocks of the machine-learned model comprises deactivating a layer of the machine-learned model.

12. The computing device of claim 1, wherein the machine-learned model comprises a convolutional neural network and at least one of the plurality of blocks comprises a convolutional block that applies at least one convolutional filter.

13. The computing device of claim 1, wherein the machine-learned model is trained against deactivation of at least some of the plurality of blocks of a neural network of the machine-learned model at an inference time, wherein training the model comprises:
iteratively training the machine-learned model using a training data set; and before at least one iteration of the iterative training of the machine-learned model, deactivating an iteration-specific subset of the plurality of blocks of the machine-learned model.

14. A computer-implemented method to reduce computational costs associated with a machine-learned model, the method comprising:

loading, by one or more computing devices into random-access memory (RAM) of the one or more computing devices, a remaining subset of a plurality of blocks of the machine-learned model to instantiate an adapted machine-learned model without a deactivated subset of the plurality of blocks;

wherein the machine-learned model comprises a plurality of blocks and one or more residual connections between two or more of the plurality of blocks, wherein the plurality of blocks has a first resource consumption quantity;

wherein the remaining subset of a plurality of blocks of the machine-learned model has a second resource consumption quantity less than the first resource consumption quantity;

wherein the deactivated subset of the plurality of blocks is deactivated by a model controller prior to the loading wherein the model controller deactivates the deactivated subset of the plurality of blocks based on accessing, by the model controller, a table that correlates a plurality of resource allocation parameter values with a respective plurality of subsets of blocks to deactivate to determine a subset of the plurality of blocks to deactivate, wherein the model controller deactivates the deactivated subset of the plurality of blocks based on a resource allocation parameter that corresponds to an allocation of system resources to the machine-learned model at an inference time; and after the loading, into the RAM, the remaining subset of the plurality of blocks to instantiate the adapted machine-learned model without the deactivated subset of the plurality of blocks:

inputting, at the inference time and by the one or more computing devices, an input set into the adapted machine-learned model;

executing, by the one or more computing devices, the adapted machine-learned model to perform inference on the input set; and receiving, by the one or more computing devices, as an output of the adapted machine-learned model, an output set.

15. The computer-implemented method of claim 14, further comprising receiving, by the one or more computing devices, the adapted machine-learned model from a separate computing device.

16. The computer-implemented method of claim 14, wherein the deactivated subset of the plurality of blocks are deactivated such that at least one residual connection bypasses each of the subset of the plurality of blocks.

17. The computer-implemented method of claim 14, wherein the resource allocation parameter is determined based on one or more of: a battery state, a current available processor power, or a number of currently running applications.

18. The computer-implemented method of claim 14, wherein the resource allocation parameter is determined based on receiving, by the one or more computing devices, an input from a user of the one or more computing devices that indicates an amount of computational resources to allocate to the machine-learned model.

19. A computing system for training a machine-learned model to be robust against deactivation of at least some of a plurality of blocks of a neural network of the machine-learned model at an inference time, the computing system comprising:

one or more processors;

a machine-learned model comprising a plurality of blocks and one or more residual connections between two or more of the plurality of blocks, wherein the machine-learned model is configured to receive a model input and, in response to receipt of the model input, output a model output, wherein the plurality of blocks has a first resource consumption quantity;

a random access memory (RAM);

at least one tangible, non-transitory computer-readable medium that stores instructions that, when executed by the one or more processors, cause the one or more processors to perform operations, the operations comprising:

for a first training iteration:

deactivating, by a model controller, a first subset of the plurality of blocks to obtain a first deactivated subset of the plurality of blocks and a first remaining subset of the plurality of blocks that does not include the first deactivated subset, wherein the first deactivated subset is deactivated based on a respective probability associated with each block of the first deactivated subset that is positively correlated with a respective position of each block of the first deactivated subset within the neural network;

loading, into the RAM, the first remaining subset of the plurality of blocks to instantiate a first adapted machine-learned model without the first deactivated subset of the plurality of blocks; and after the loading, into the RAM, the first remaining subset of the plurality of blocks to instantiate the first adapted machine-learned model without the first deactivated subset of the plurality of blocks:

inputting a first training input into the first adapted machine-learned model;

receiving a first training output from the first adapted machine-learned model; and training the first adapted machine-learned model based on the first training output; and for a second training iteration:

deactivating, by the model controller, a second subset of the plurality of blocks to obtain a second deactivated subset of the plurality of blocks and a second remaining subset of the plurality of blocks that does not include the second deactivated subset, wherein the second deactivated subset is deactivated based on a respective probability associated with each block of the second deactivated subset that is positively correlated with a respective position of each block of the second deactivated subset within the neural network;

loading, into the RAM, the second remaining subset of the plurality of blocks to instantiate a second adapted machine-learned model without the second deactivated subset of the plurality of blocks; and after the loading, into the RAM, the second remaining subset of the plurality of blocks to instantiate the second adapted machine-learned model without the second deactivated subset of the plurality of blocks:

inputting a second training input into the second adapted machine-learned model;
receiving a second training output from the second adapted machine-learned model; and
training the second adapted machine-learned model based on the second training output.

* * * * *